(12) United States Patent
Moribe et al.

(10) Patent No.: US 8,037,161 B2
(45) Date of Patent: Oct. 11, 2011

(54) NETWORK SYSTEM, NETWORK DEVICE, AND NETWORK BELONGING JUDGMENT METHOD

(75) Inventors: Hirotaka Moribe, Yokohama (JP);
Nobuaki Kohinata, Yokohama (JP);
Mika Mizutani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1197 days.

(21) Appl. No.: 11/688,616

(22) Filed: Mar. 20, 2007

(65) Prior Publication Data

US 2007/0226329 A1    Sep. 27, 2007

(30) Foreign Application Priority Data

Mar. 23, 2006    (JP) .................................. 2006-080462

(51) Int. Cl.
*G06F 15/173* (2006.01)
(52) U.S. Cl. ...................................................... 709/223
(58) Field of Classification Search ................... 709/223
See application file for complete search history.

(56) References Cited

U.S. PATENT DOCUMENTS

| | | | | |
|---|---|---|---|---|
| 7,765,603 B2 * | 7/2010 | Tanaka | ............................ | 726/28 |
| 7,778,927 B2 * | 8/2010 | Kawakami | ...................... | 705/59 |
| 7,788,271 B2 * | 8/2010 | Soma et al. | .................... | 707/758 |
| 7,844,818 B2 * | 11/2010 | Park | .............................. | 713/168 |

FOREIGN PATENT DOCUMENTS

JP    2005-301633    10/2005

OTHER PUBLICATIONS

Jon Postel; Internet Protocol; RFC: 791; USC/Information Sciences Institute; Sep. 1981; p. 1-45.

* cited by examiner

*Primary Examiner* — Larry Donaghue
(74) *Attorney, Agent, or Firm* — Antonelli, Terry, Stout & Kraus, LLP.

(57) ABSTRACT

The present invention improves user-friendliness and protect content with increased reliability when judging whether network devices belong to the same home network. While the connection to a network is established, each network device uses a peripheral device information collection unit to collect peripheral device information indicating which ones of devices are connected to the network, and store the collected information in a peripheral device information storage unit as home network information. When the belonging of a remote device is to be judged, the home network information stored in the remote device is received. A peripheral device information collation unit collates the received home network information with the home network information stored in the peripheral device information storage unit to judge whether the remote device belongs to the same network as the local device.

10 Claims, 6 Drawing Sheets

FIG.5

| | CONSTANTLY CONNECTED 40a | | CONNECTED FOR LONG PERIOD OF TIME 40b | | CONNECTED FOR SHORT PERIOD OF TIME 40c | | CONSTANTLY CONNECTED 40d | | NOT CONNECTED 40e |
|---|---|---|---|---|---|---|---|---|---|
| # | UDN | # | UDN | # | UDN | # | UDN | # | UDN |
| 1 | A | 1 | B | 1 | C | 1 | D | 1 | E |
| 2 | D | 2 | C | 2 | A | 2 | B | 2 | F |
| 3 | B | 3 | A | 3 | D | 3 | C | 3 | G |
| 4 | C | 4 | D | 4 | B | 4 | A | 4 | H |
| 5 | A | 5 | B | 5 | C | 5 | D | 5 | Q |
| 6 | D | 6 | C | 6 | A | 6 | B | 6 | E |
| 7 | B | 7 | A | 7 | D | 7 | C | 7 | F |
| 8 | C | 8 | D | 8 | B | 8 | A | 8 | G |
| 9 | A | 9 | B | 9 | I | 9 | D | 9 | H |
| 10 | D | 10 | A | 10 | J | 10 | B | 10 | E |
| 11 | B | 11 | D | 11 | K | 11 | A | 11 | F |
| 12 | A | 12 | B | 12 | L | 12 | D | 12 | G |
| 13 | D | 13 | D | 13 | I | 13 | B | 13 | H |
| 14 | B | 14 | I | 14 | J | 14 | D | 14 | E |
| 15 | A | 15 | J | 15 | K | 15 | A | 15 | F |
| 16 | D | 16 | K | 16 | L | 16 | D | 16 | G |
| 17 | B | 17 | L | 17 | I | 17 | · | 17 | H |
| REFERENCE | | RATE OF AGREEMENT = 12/17 | | RATE OF AGREEMENT = 8/17 | | RATE OF AGREEMENT = 13/17 | | RATE OF AGREEMENT = 0/17 | |

NETWORK SYSTEM, NETWORK DEVICE, AND NETWORK BELONGING JUDGMENT METHOD

CLAIM OF PRIORITY

The present application claims priority from Japanese application Ser. No. JP 2006-080462, filed on Mar. 23, 2006, the content of which is hereby incorporated by reference into this application.

BACKGROUND OF THE INVENTION (1) Field of the Invention

The present invention relates to a network system, network device, and network belonging judgment method that are capable of judging whether a plurality of network-connected devices belong to the same home network.

(2) Description of the Related Art

As the number of information devices used at home is increased, a home network system is commercialized. In the home network system, a LAN (Local Area Network) to which various devices are connected and mutually exchange content is established. When information devices use copyright-protected digital content, illegal duplication or use of such content is prohibited such as posting of content on the Internet to be accessed or acquired by the general public. Meanwhile, there is a proposal in which digital content is permitted to be copied and to be distributed into a device inserted in a home network within the scope of private use, which is a limited scope of the home network and the like, from a perspective of flexible management of digital content. It is also conceivable that the devices belonging to the same home network may be entitled to receive specific services in addition to the use of digital content.

To establish and properly manage such a home network as described above, it is necessary to determine the network to which various information devices belong. Further, when a plurality of devices exchange content, it is necessary to accurately judge whether the devices belong to the same home network. Methods for defining the network belonging of each device are described below.

A first method formulates a definition by using an IP packet TTL (Time To Live) value in an IP network that is disclosed by Non-patent Document 1 (RFC791, Internet Protocol, J. Postel, September 1981). For example, the TTL value is set to 1 to limit content distribution to a range that is not beyond a router. More specifically, this method defines a home network as a single physical network, and judges that devices physically connected to the same physical network belong to the home network.

A second method uses a group management server that is disclosed by Patent Document 1 (Japanese Patent Laid-open No. 2005-301633). This method defines devices registered in the group management server as devices that belong to the same home network. Content is permitted to be privately used within the same home network. Further, the content can be distributed and played back under separately stipulated content playback permission conditions or the like.

SUMMARY OF THE INVENTION

The home network to be managed at home may be configured in various manners. Therefore, it is preferred that a device management method be capable of handling various configurations in a flexible manner. However, the following problems arise when the aforementioned techniques are used.

The method disclosed by Non-patent Document 1 gives a fixed TTL value to define the scope of a home network physically or uniformly. When this method is used, a device that is usually connected to a specific home network for use is not recognized as a device that belongs to the network if it is not physically connected to the network at present. This corresponds to a situation where, for instance, a terminal device is used at an outside location and connected to the home network through another network for the purpose of accessing another device that is connected to the home network. In this instance, the terminal device, which is currently away from home, cannot receive services offered to the devices that belong to the home network. This situation is inconvenient for the user. To prove that the terminal device, which is currently away from home, is entitled to receive the services, it is necessary to use a separate authentication means.

On the other hand, the method disclosed by Patent Document 1 can allow a desired device to join the home network by registering it in the group management server. In such an instance, a device that has illegally joined in the home network might steal content, which is private information distributed within the network, depending on management exercised by an administrator who permits registration.

To solve the above problems, it is necessary to devise a new method for judging whether devices belong to the same home network. An object of the present invention is to improve user-friendliness and provide a device belonging judgment method for use in a home network to protect content with increased reliability.

According to one aspect of the present invention, there is provided a network system in which a plurality of network devices are connected to a network, wherein each network device includes a peripheral device information collection unit which collects peripheral device information indicating which ones of network devices are connected to the network while the connection to the network is established; a peripheral device information storage unit which stores home network information, which is a chronological list of network devices connected to the network, in accordance with the collected peripheral device information; a peripheral device information transmission unit which transmits the home network information stored in the peripheral device information storage unit in compliance with a request from another network device; a peripheral device information reception unit which requests another network device to deliver the home network information stored therein and receives the delivered home network information; and a peripheral device information collation unit which collates the home network information received from another network device through the peripheral device information reception unit with the home network information stored in the peripheral device information storage unit and judges whether the other network device belongs to the same network as the local network device.

According to another aspect of the present invention, there is provided a network belonging judgment method for judging whether a first network device and a second network device, which are connectable to a network, belongs to the same network, wherein each network device collects peripheral device information indicating which ones of network devices are connected to the network while the connection to the network is established, and stores home network information, which is a chronological list of network devices connected to the network, in accordance with the collected peripheral device information. When the belonging of the second network device is to be determined, the first network device receives the home network information stored in the second network device, collates the received home network information with the home network information stored in the first network device, and determines in accordance with the collation result whether the second network device belongs to the same network as the first network device.

When a plurality of devices are to be used through a home network, the present invention provides improvement of user-friendliness and protect content in a more flexible manner.

BRIEF DESCRIPTION OF THE DRAWINGS

These and other features, objects and advantages of the present invention will become more apparent from the following description when taken in conjunction with the accompanying drawings.

FIG. 5 shows examples of home network information 40a-40e that is stored in each of network devices 3a-3e.

DESCRIPTION OF THE PREFERRED EMBODIMENTS

Figure 1:
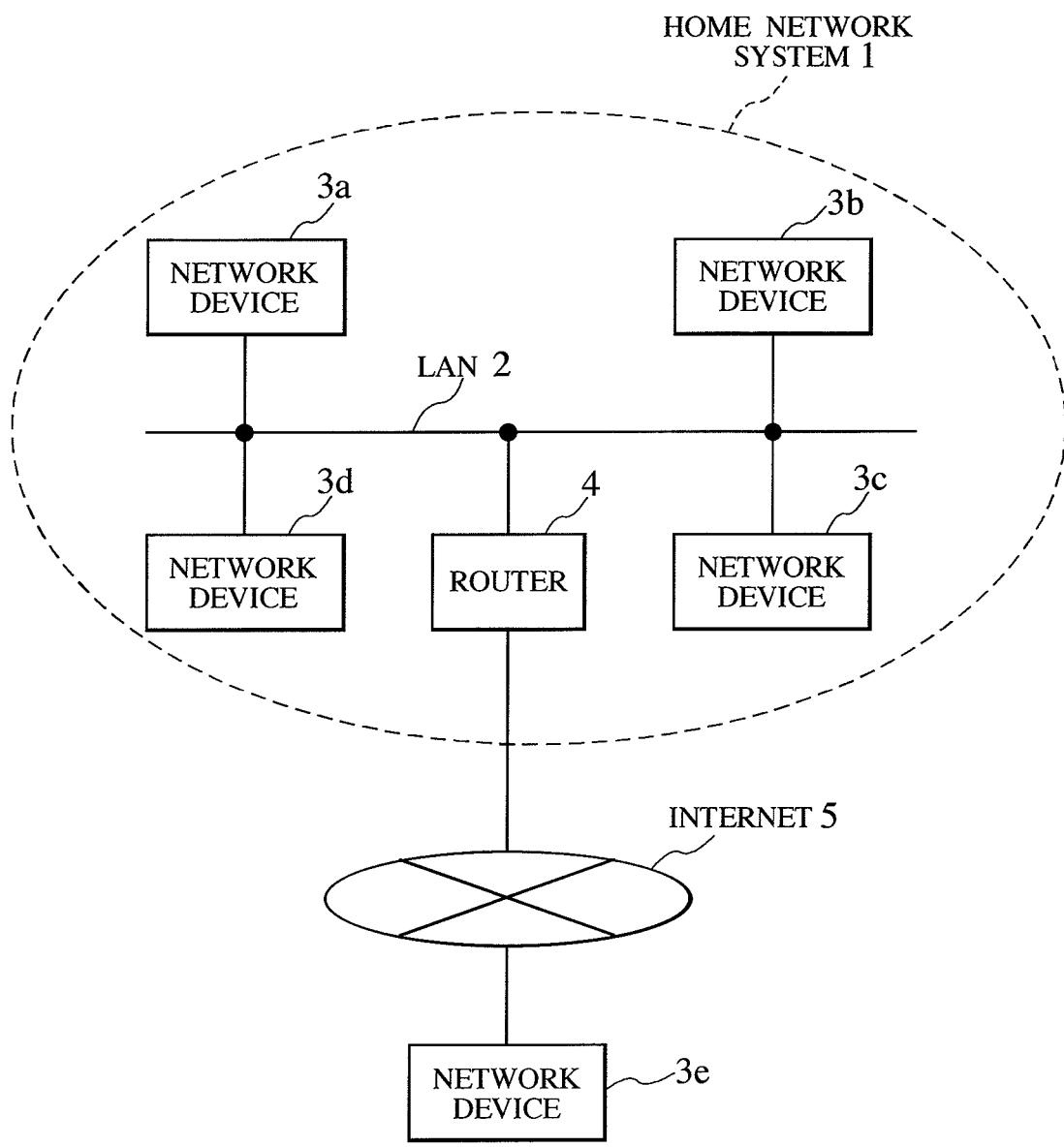
FIG. 1 is an overall block diagram illustrating a home network system 1 according to an embodiment of the present invention.

FIG. 1 is an overall block diagram illustrating a home network system 1 according to an embodiment of the present invention. The home network system 1 includes a LAN (Local Area Network) 2, a plurality of network devices 3 connected to the LAN, and a router 4. Further, the home network system 1 is connected to the Internet 5 via the router 4. The LAN 2 is established, for instance, with an Ethernet (registered trademark), telephone line, power line, radio transmission, infrared light, or another communication line. The network devices 3 may be personal computers, HDD recorders having a communication function, mobile players that are excellent in portability and can play back video and audio, or cellular phones or other mobile terminals. These network devices 3 are interconnected via the LAN 2 and allowed to exercise their communication functions. Further, the network devices 3 connected to the LAN 2 are capable of communicating with an external device via the router 4 and the Internet 5. Here the term "connected" means that the devices are not only physically connected but also capable of communicating with each other.

Here it is assumed that the network devices 3 are used in five different styles (3a-3e) described below. The network devices 3a and 3d are constantly connected to the LAN 2 for use. The network device 3b is a mobile device that is excellent in portability and connected to various networks for use. Most of the time, however, the network device 3b is connected to the LAN 2. The network device 3c is also a mobile device that is connected to various networks for use. However, the network device 3c is connected to the LAN 2 for a limited period of time. The network device 3e is an external device that is connected to the Internet 5. However, the network device 3e is never connected to the LAN 2. As described above, the network devices differ in the period of time during which (in the frequency with which) they are connected to the LAN 2 for use.

The present embodiment is characterized by the fact that it is whether the devices belong to the network system 1 using, as an index, the period of time during which (the frequency with which) the devices share the LAN 2. More specifically, the present embodiment judges that the network devices 3a and 3d, which are constantly connected to the LAN 2, belong to the home network system 1, and judges that the network device 3e, which is never connected to the LAN 2, does not belong to the home network system 1. The network device 3e is a device that belongs to another home network system or a device that does not belong to any home network system. The present embodiment judges that the network device 3b, which is a mobile device and connected to the LAN 2 for a long period of time, belongs to the home network system 1. While network device 3b is used at an outside location, the present embodiment judges that the network device 3b belongs to the home network system 1 although it is not connected to the LAN 2 during such a period. Conversely, the present embodiment judges that the network device 3c, which is a mobile device and connected to the LAN2 for a limited period of time, does not belong to the home network system 1. Even if the network device 3c is connected to the LAN 2 in a certain situation, the present embodiment judges that the network device 3c does not belong to the home network system 1. As described above, the present embodiment defines whether a network device belongs to the home network system 1 by noting the period of time during which (the frequency with which) the network device has been connected to the LAN 2. The above definition is formulated without regard to the current connection between the network device and the LAN or the Internet.

Figure 2:
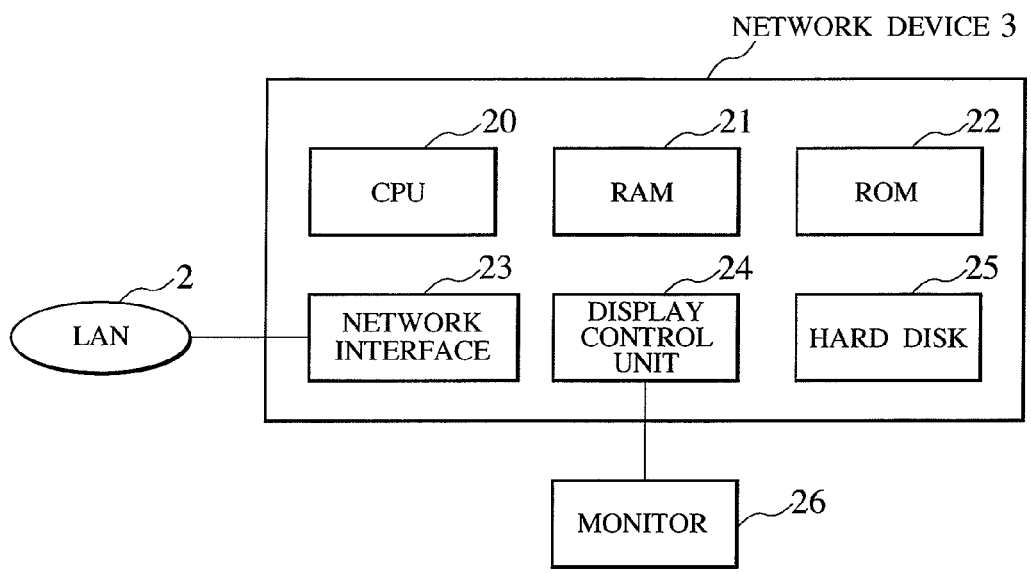
FIG. 2 shows a hardware configuration of a network device 3 according to an embodiment of the present invention.

FIG. 2 shows a hardware configuration of the network device 3 according to the present embodiment. The network device may be, for instance, a personal computer or a HDD recorder having a communication function. The network device 3 includes a CPU 20, which provides overall control over the network device 3; a RAM (Random Access Memory) 21 and a ROM (Read Only Memory) 22, which store data and programs; a network interface 23, which exchanges data with the other network devices via the LAN 2; a display control unit 24, which exercises control to display information on an externally connected monitor 26; and a hard disk 25, which records data and content. The hard disk 25 may be substituted by another recording medium (e.g., optical disk or semiconductor memory). Further, the monitor 26 may be built in the network device 3. The CPU 20 reads a program stored in the ROM 22, loads the read program into the RAM 21, and executes various functions, which are described later.

Figure 3:
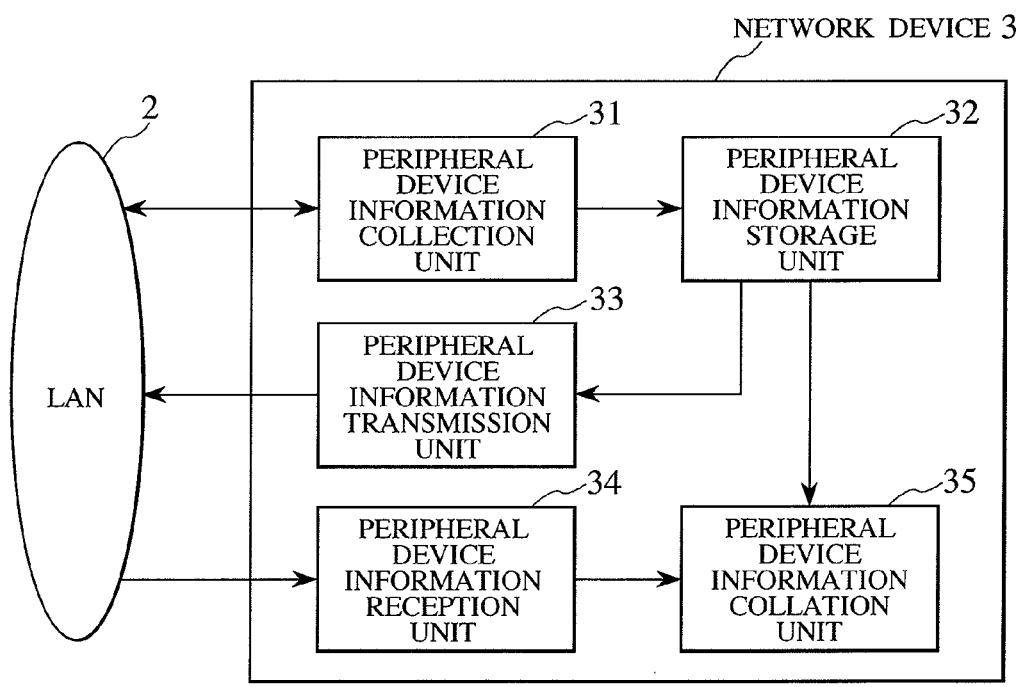
FIG. 3 shows functional blocks of the network device 3 shown in FIG. 2.

FIG. 3 shows functional blocks of the network device 3 shown in FIG. 2. The network device 3 includes a peripheral device information collection unit 31, a peripheral device information storage unit 32, a peripheral device information transmission unit 33, a peripheral device information reception unit 34, and a peripheral device information collation unit 35. This figure shows functions necessary for network belonging judgment and excludes the other device-specific functions (e.g., content transmission/reception, processing, recording, and display functions). In the following description, the functional blocks possessed by the network devices 3a, 3b, and so on are designated, for instance, by 31a, 31b, and so on.

The peripheral device information collection unit 31 collects, through the LAN 2, the device information about the other network devices (hereinafter referred to as the peripheral devices) and the information indicating, for instance, whether the peripheral devices have participated in or departed from the LAN 2. These items of information are hereinafter referred to as the "peripheral device information." When a peripheral device has participated in the LAN 2, it means that the peripheral device has started connecting with the LAN 2 or is being connected with the LAN 2. When a peripheral device has departed from the LAN 2, it means that the peripheral device has been disconnected with the LAN 2 or is being disconnected from the LAN 2. Although the peripheral device information can be collected by using various existing technologies, it is assumed that UPnP (Universal Plug and Play) is used. When UPnP is used, the devices connected to the LAN 2 can mutually transmit device information to and receive device information from each other at fixed time intervals. Further, since each device can receive the information about itself, the term "peripheral devices" includes the local device as well. The information to be collected includes the information contained in a device description or service description possessed by the peripheral devices and the information indicating the participation of the peripheral devices in the LAN 2 and the departure of the peripheral devices from the LAN 2, which can be grasped by SSDP (Simple Service Discovery Protocol).

The peripheral device information storage unit 32 records and stores the peripheral device information that was collected by the peripheral device information collection unit 31. In such an instance, the collected information may be processed before being recorded. As mentioned earlier, the peripheral device information to be recorded includes the device information about the peripheral devices connected to the LAN 2 and the information indicating the participation of the peripheral devices in the LAN 2 and the departure of the peripheral devices from the LAN 2. To collect and record the aforementioned information, it is necessary that the local device be connected to the LAN 2. If the local device is departed from the LAN 2 for a certain period, the peripheral device information about that period cannot be collected and would be missing. Therefore, the peripheral device information stored in each device is unique because it reflects the participation/departure history of each device.

The peripheral device information stored in each network device can be mutually transmitted to and received from the devices. In response to a request from a remote peripheral device, the device information transmission unit 33 reads the peripheral device information recorded in the peripheral device information storage unit 32 and transmits it to the remote peripheral device through the LAN 2. Conversely, the peripheral device information reception unit 34 requests a remote peripheral device to transmit the peripheral device information stored in the peripheral device and receives the peripheral device information from the remote peripheral device through the LAN 2. In the above instance, a one-to-one authentication means may be used between the device information transmission unit 33 of the device at a transmitting end and the device information reception unit 34 of the device at a receiving end to judge whether the devices are legal and entitled to exchange information. Although the device information reception unit 34 is functionally separate from the peripheral device information collection unit 31, they can be implemented by common hardware.

The peripheral device information collation unit 35 collates the peripheral device information stored in the peripheral device information storage unit 32 of the local device with the peripheral device information stored in a remote device, which was received by the device information reception unit 34. Further, the peripheral device information collation unit 35 judges whether the local device and remote device belong to the same home network by checking whether the collated sets of peripheral device information are identical with each other, determining the degree of agreement between the collated sets of peripheral device information, or by checking whether the collated sets of peripheral device information exhibit the same tendency. When the two devices have participated in the LAN 2 for a long period of time, the peripheral device information about one device is similar to the peripheral device information about the other device. In this instance, the peripheral device information collation unit 35 judges that the two devices belong to the same home network. However, if either of the two devices has participated in the LAN 2 for a short period of time, the peripheral device information about one device is different from the peripheral device information about the other device. In this instance, the peripheral device information collation unit 35 judges that the two devices do not belong to the same home network. The algorithm employed for judgment purposes calculates the rate of agreement between the two devices and checks whether the calculated value is not smaller than a reference value. Here it is assumed that when the calculated value is equal to or larger than a predetermined value (e.g., 50%), the peripheral device information collation unit 35 judges that the two devices belong to the same home network. The peripheral device information is used to judge the belonging to the home network as described above, and is hereinafter referred to as the "home network information" for explanation purposes.

Figure 4:
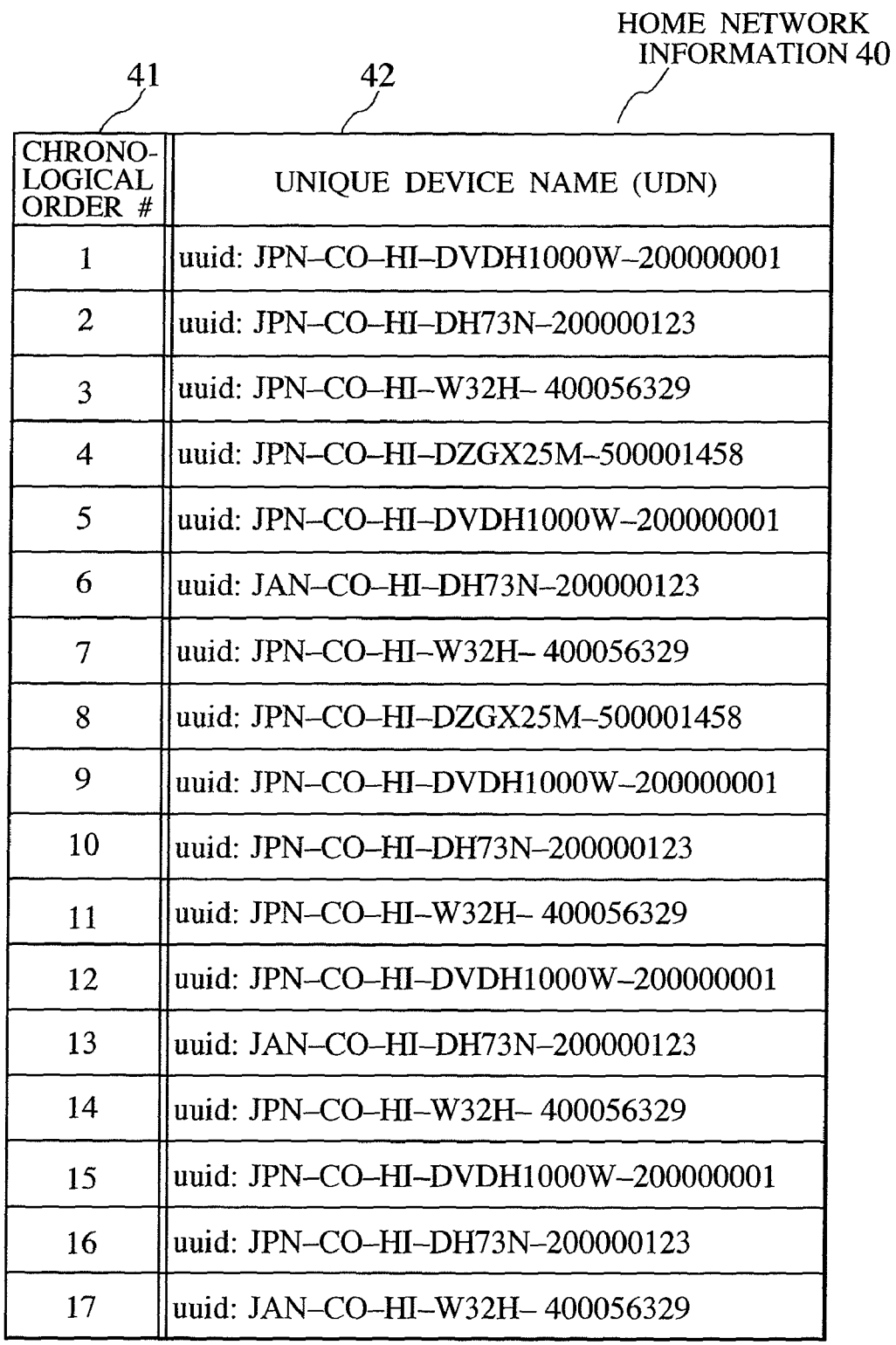
FIG. 4 shows an example of home network information that is recorded in a peripheral device information storage unit 32.

FIG. 4 shows an example of home network information (peripheral device information) that is recorded in the peripheral device information storage unit 32. In accordance with information that the peripheral device information collection unit 31 has collected from the peripheral devices at fixed time intervals, the peripheral device information storage unit 32 (which corresponds to the RAM 21 or hard disk 25) records and stores home network information 40. The home network information 40 is log information about a list of network devices that are currently connected to the LAN 2 or were found to be connected to the LAN 2. The list of network devices contains log information indicating that the local device is connected to the LAN 2.

For example, a friendly name derived from the device description of a network device, a UDN (Unique Device Name), which is a unique identifier, a manufacturer name, a serial number, and other device information and the time information about an SSDP alive packet received from the network device can be recorded. For the sake of brevity, FIG. 4 lists log information that indicates device names (UDNs) 42 in plain text format in chronological order 41 in which SSDP alive packets were received. The home network information 40 may be encrypted or otherwise processed before being written so that it will not be falsified.

FIG. 5 shows examples of home network information 40*a*-40*e* that is stored in various network devices 3*a*-3*e*. This figure shows log information (history) that has been recorded in each device for a fixed period of time. For the sake of brevity, however, alphabetical letters (A, B, C, . . . ) are used to represent device names (UDNs). The home network information may be written to indicate the #-and-UDN relationship representing a connection status of each of network devices connected with the network at a particular point of time instead of history records.

The following home network information about the devices will be described on the assumption that it reflects the connection status (connection time) of each of the devices described with reference to FIG. 1. More specifically, information 40a and information 40d relate to devices that are constantly connected to the LAN 2 for use; information 40b relates to a mobile device that is connected to the LAN 2 for a long period of time; information 40c relates to a mobile device that is connected to the LAN 2 for a short period of time; and information 40e relates to a device that is never connected to the LAN 2.

The home network information shown in FIG. 5 will now be used to describe in detail an operation that is performed to judge whether two devices belong to the same home network. Basically, the degree of agreement between the UDN columns of the home network information about the devices is calculated to make a judgment. In such an instance, the entire home network information stored in the devices may be referenced. Practically, however, only the information collected during an appropriate period (e.g., during the last one-month period) should be referenced. Two extracted UDN columns are then compared. While the UDN columns are shifted in chronological direction, the rate of agreement is determined when the number of matching UDNs is maximized. When the rate of agreement is equal to or larger than a predetermined value (e.g., 50%), it is judged that the two devices belong to the same home network.

Here it is necessary to note which device is referenced for judgment purposes. The reason is that when, for instance, content is to be distributed, it is necessary that the device that transmits the content judge whether the device that receives the content belongs to the same home network. On the contrary, if the device that receives the content judges whether the device that transmits the content belongs to the same home network, the obtained judgment result is meaningless. When the rate of agreement is to be calculated, the total number of UDN columns on the judging side (of the transmitting device) is given as a population parameter. The judging side may differ from the judged side in the total number of UDN columns. If the judging side and judged side are interchanged, a different rate of agreement may be obtained.

In the following examples, it is assumed that network device 3a is a transmitting device whereas network devices 3b to 3e are receiving devices. The examples are used to illustrate operations that are performed to judge whether the devices belong to the same home network.

<Devices 3a and 3b>

A comparison between home network information 40a and home network information 40b reveals that twelve UDN columns (B, C, A, ... B) for listings #3 to #14 of information 40a and listings #1 to #12 of information 40b agree with each other. The rate of agreement is 12/17=71% because the list length of information 40a is 17. Since the rate of agreement is more than half the list length of the transmitting end (not less than 50%), the judgment reference is satisfied. Thus, it is judged that the receiving device 3b belongs to the same home network as the transmitting device 3a. As a result, it is judged that device 3b, which is a mobile device connected to the LAN2 for a long period of time, belongs to the same home network even when it is used at an outside location, and device 3b can receive content and the like from device 3a.

<Devices 3a and 3c>

A comparison between the home network information 40a and the home network information 40c reveals that eight UDN columns (C, A, D, ... B) for listings #4 to #11 of the information 40a and listings #1 to #8 of the information 40c agree with each other. The rate of agreement is 8/17=47% because the list length of information 40a is 17. It is therefore judged that the device 3c does not belong to the same home network as the device 3a. As a result, it is judged that the device 3c, which is a mobile device connected to the LAN2 for a short period of time, does not belong to the same home network even when it is currently connected to the LAN 2. Thus, the device 3a refuses to transmit content and the like to the device 3c. Consequently, it is possible to inhibit content from being transmitted to devices that have been connected to the LAN 2 for a short period of time, thereby improving copyright protection.

<Devices 3a and 3d>

A comparison between the home network information 40a and the home network information 40d reveals that thirteen UDN columns (D, B, C, ... B) for listings #2 to #14 of the information 40a and listings #1 to #13 of the information 40d agree with each other. The rate of agreement is 13/17=76% because the list length of information 40a is 17. It is therefore judged that the device 3d belongs to the same home network as the device 3a.

<Devices 3a and 3e>

A comparison between the home network information 40a and the home network information 40e reveals that no UDN columns agree with each other. Since the rate of agreement is 0%, it is judged that the device 3e does not belong to the same home network as the device 3a.

The same judgment process as described above can be performed between the other devices. However, the description of such a judgment process is omitted. If the judging side device and judged side device are interchanged, a different rate of agreement may be obtained. Therefore, a different judgment result may be produced.

As described above, the present embodiment judges that a mobile device (device 3b in the above example) which has been connected to the LAN for a long period of time belongs to the same home network as the device 3a even when the mobile device is disconnected from the LAN and used at an outside location. This provides improvement of user-friendliness. On the contrary, the present embodiment judges that a mobile device (device 3c in the above example) which has been connected to the LAN for a short period of time does not belong to the same home network as device 3a even when the mobile device is currently connected to the LAN. This inhibits the mobile device from receiving content and the like, thereby improving content protection.

In the above example, it is assumed that the two devices belong to the same home network when the rate of agreement is equal to or higher than 50%. However, it goes without saying that the required rate of agreement may be changed depending on the situation. Further, the above example determines the rate of agreement on condition that UDN columns consecutively agree with each other. Alternatively, however, the rate of agreement may be determined in a flexible manner when, for instance, nonconsecutive UDNs agree with each other while one or more intermediate UDNs disagree with each other.

A network device belonging judgment method for use in the home network system according to the present embodiment will now be described with reference to a flowchart.

Figure 6:
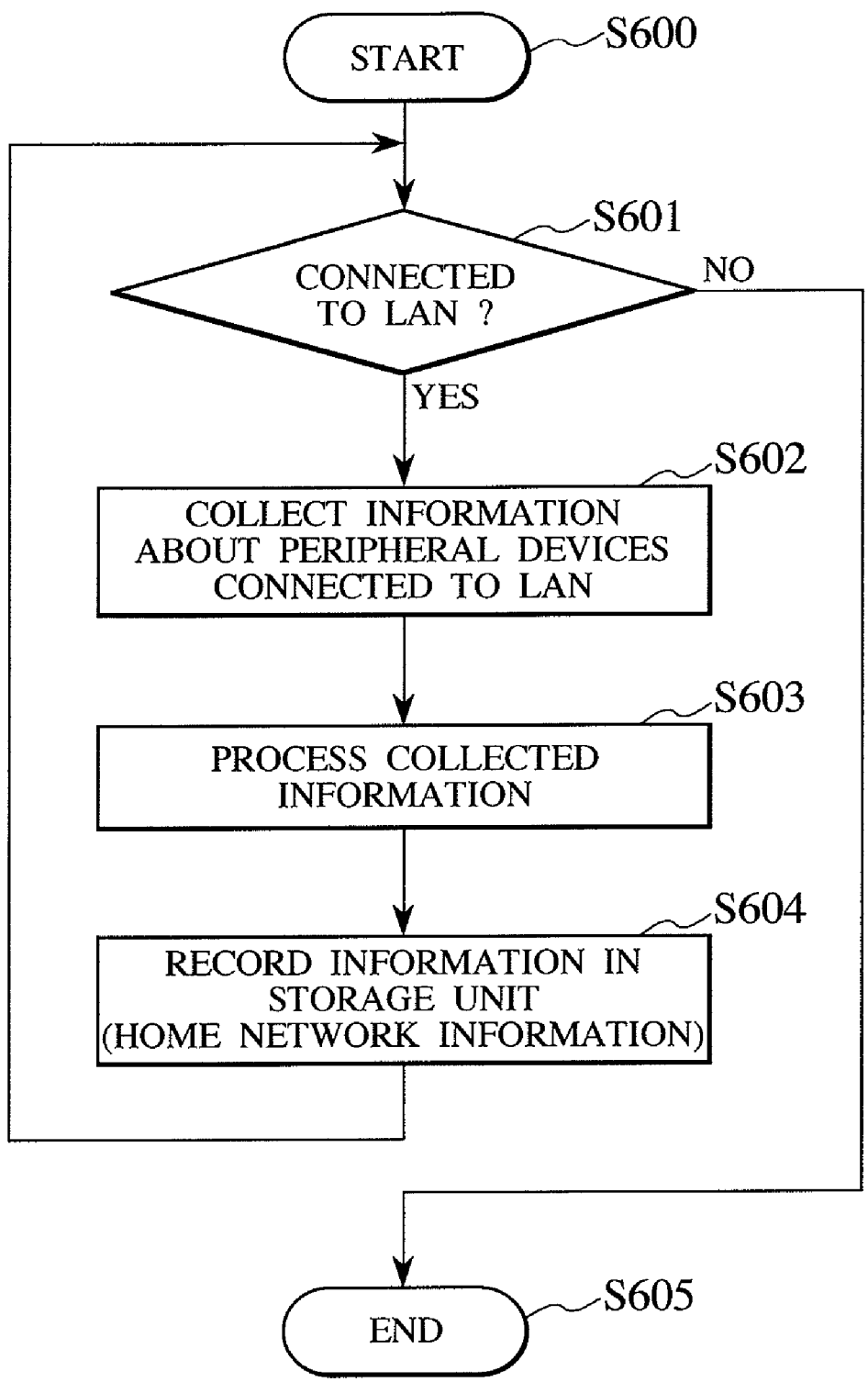
FIG. 6 is a flowchart illustrating how a network device 3a collects the information about peripheral devices.

FIG. 6 is a flowchart illustrating how the network device 3a performs a process (S600) for collecting the information about peripheral devices.

The device 3a is connected to the LAN (step S601). If the device 3a is not connected to the LAN, the following collection process cannot be performed. When the device 3a is connected to the LAN, peripheral devices (the other devices such as devices 3b and 3c) that are connected to the same LAN transmit connection information at fixed time intervals, and the peripheral device information collection unit 31 collects the transmitted connection information (step S602). More specifically, the peripheral device information collection unit 31 collects the device information about the peripheral devices connected to the LAN, which can be obtained by using UPnP, and receives participation/departure information, which the peripheral devices transmit by using SSDP. Step S603 is then performed to process the collected information as needed. For example, the collected information is thinned out or encrypted to obtain home network information 40a. However, step S603 may be skipped. Peripheral device information storage unit 32a records and stores home network information 40a in the RAM 21 or on the hard disk 25 (step S604). The device 3a repeats the above information collection process to accumulate and store the home network information 40a.

The information collection process is also repeatedly performed in like manner with respect to the other network devices (e.g., devices 3b and 3c), and home network information 40b and home network information 40c are accumulated and stored in peripheral device information storage units 32b and 32c.

Figure 7:
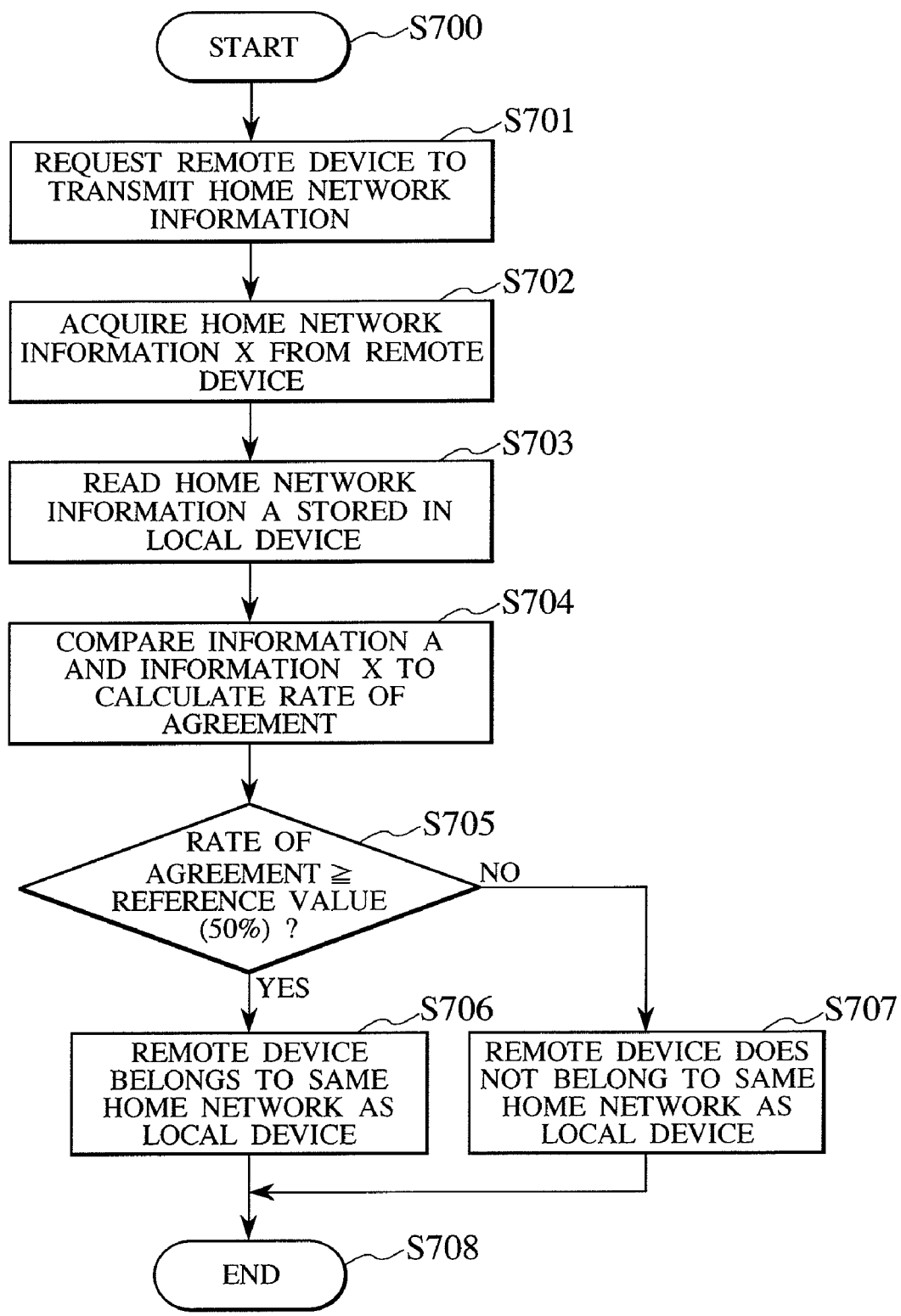
FIG. 7 is a flowchart illustrating how a network device 3a operates to judge whether another network device 3x belongs to the same home network.

FIG. 7 is a flowchart illustrating a process (S700) that network device 3a performs to judge whether another network device (hereinafter referred to as network device 3x) belongs to the same home network as the network device 3a.

The device 3a requests device 3x, which is a device targeted for belonging judgment, to transmit home network information 40x, which is stored in the device 3x (step S701). The device 3x then transmits the home network information 40x, which is stored in peripheral device information storage unit 32x, to the device 3a. The device 3a uses peripheral device information reception unit 34a to acquire the transmitted information (step S702). Further, the device 3a reads the home network information 40a, which is stored in the local peripheral device information storage unit 32a (step S703).

Next, the device 3a uses peripheral device information collation unit 35a to compare the two pieces of home network information 40a, 40x that were obtained in steps S702 and S703. In this instance, the device 3a determines the degree of agreement between the two pieces of home network information (step S704). More specifically, the device 3a performs calculations to determine the rate of agreement in UDN column between the information 40a and the information 40x. Step S705 is then performed to judge whether the rate of agreement in UDN column is equal to or higher than a judgment reference (50% in the current example). If the determined rate of UDN column agreement is equal to or higher than the judgment reference, the device 3a judges that the device 3x belongs to the same home network as the device 3a (step S706). If, on the other hand, the determined rate of UDN column agreement is smaller than the judgment reference, the device 3a judges that the device 3x does not belong to the same home network as the device 3a (step S707).

An operation that the network device 3a performs to judge whether the network device 3b belongs to the same home network as the network device 3a will now be described as a concrete example of the steps indicated in FIGS. 6 and 7. Here, the network device 3a is constantly connected to the LAN 2 for the home network system 1, and the network device 3b is excellent in portability and is connected to the LAN 2 most of the time during which it is connected to a network.

First of all, the network devices 3a and 3b start performing the information collection process (S600) independently. While the network devices 3a and 3b are connected to the LAN 2 (when the query in step S601 is answered "Yes"), the network devices 3a and 3b uses peripheral device information collection units 31a and 31b, respectively, to collect UPnP-based peripheral device information that is transmitted from the network devices (peripheral devices) connected to the LAN 2 (step S602). The network devices 3a and 3b process the collected information in a predetermined manner to obtain home network information (step S603), and record the obtained home network information in their respective peripheral device information storage units 32a, 32b (step S604). The collection and recording steps are repeatedly performed so that peripheral device information storage units 32a and 32b store the home network information (UDN columns) 40a, 40b as indicated in FIG. 7. The network device 3a collects and stores the whole peripheral device information because it is constantly connected to the LAN 2. On the other hand, the network device 3b is of a portable type and cannot collect the peripheral device information while it is not connected to the LAN. Therefore, the information for a period during which the network device 3b is not connected is not included.

A belonging judgment process will now be described. Here it is assumed that network device 3b is currently departed from the LAN 2 and connected with the Internet 5, and makes a request for a service (e.g., content distribution service) that is offered by network device 3a which is connected to the LAN 2. In this instance, the network device 3a, which is a service provider, judges whether the network device 3b, which has made a request, belongs to the same home network as the network device 3a. The network device 3a first requests the network device 3b to transmit the home network information 40b, which is stored in the peripheral device information storage unit 32b, and acquires the home network information 40b (steps S701 and S702). The information is transmitted through the peripheral device information transmission unit 33b of the network device 3b, the Internet 5, the LAN 2, and the peripheral device information reception unit 34a of the network device 3a. Further, the network device 3a reads the home network information 40a, which is stored in the local peripheral device information storage unit 32a (step S703).

The network device 3a uses the peripheral device information collation unit 35a to compare the two pieces of the home network information 40a, 40b, and calculates the rate of information agreement (the rate at which their UDN columns consecutively match). In the example shown in FIG. 5, the rate of agreement, which is calculated in step S704, is 71%. This means that the network devices 3a and 3b share 71% of their LAN connection time. If the judgment made in step S705 is based on a judgment reference indicating that the two network devices belong to the same home network when the rate of agreement is not lower than 50%, the network device 3a judges that the network device 3b belongs to the same home network as the network device 3a (step S706). In accordance with the obtained judgment result, the network device 3a gives service to the network device 3b, for instance, by distributing requested content to the network device 3b.

When the network device targeted for judgment is changed, the above judgment process is performed on a targeted network device to judge whether it belongs to the same home network.

Further, when the device 3a receives the home network information 40b from the device 3b in Step 702, increased safety can be achieved if a mutual authentication and encryption of information to be exchanged are performed between the devices.

The present embodiment, which has been described above, may be modified in various manners as described below.

The present embodiment assumes that the network device 3a includes the peripheral device information storage unit 32a. However, the peripheral device information storage unit 32a may be provided in another network device such as the network device 3*b*. When such an alternative configuration is employed, the peripheral device information collected by the network device 3*a* is transferred to the network device 3*b* to be recorded. Further, the present embodiment assumes that the network device 3*a* includes the peripheral device information collation unit 35*a*. However, the peripheral device information collation unit 35*a* may be similarly provided in another network device such as the network device 3*b*.

When judging whether a remote network device belongs to the same home network as a local network device, the present embodiment applies the same rule in all the above examples (e.g., assumes that the required rate of agreement is not lower than 50%). Alternatively, however, the rule to be applied may be changed in accordance with the characteristics of individual network devices.

The present embodiment assumes that the belonging judgment process is performed between the network device 3*a*, which provides a service, and the network device 3*b*, which receives service, that is, between the two parties concerned. Alternatively, however, a substitute network device may make a belonging judgment. For example, the network device 3*d*, which belongs to the same home network as the network device 3*a*, may be employed as a substitute for network device 3*a* so that the belonging judgment process is performed between the network devices 3*d* and 3*b*. In accordance with the obtained judgment result, the network device 3*a* may determine whether it can give a service to the network device 3*b*.

The present embodiment assumes that the peripheral device information collation unit 35 performs the belonging judgment process by using the device information history of network device connections to the LAN 2. Alternatively, however, the network device connection status prevailing at a particular point of time may be used instead of the history.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A network system in which a plurality of network devices are connected to a network,
    wherein each of the plurality of network devices includes:
    a peripheral device information collection unit which collects peripheral device information indicating which ones of the network devices are connected to the network while the connection to the network is established;
    a peripheral device information storage unit which stores home network information, which is a chronological list of network devices connected to the network, in accordance with the collected peripheral device information;
    a peripheral device information transmission unit which transmits the home network information stored in the peripheral device information storage unit in compliance with a request from another network device;
    a peripheral device information reception unit which requests the other network device to deliver the home network information stored therein and receives the delivered home network information; and
    a peripheral device information collation unit which collates the home network information received from the other network device through the peripheral device information reception unit with the home network information stored in the peripheral device information storage unit and judges whether the other network device belongs to the same network as the local network device.

2. The network system according to claim 1, wherein, when the rate of agreement of device listings contained in the two pieces of the home network information is not lower than a predetermined value, the peripheral device information collation unit judges that the other network device belongs to the same network as the local network device.

3. A network device which is one of a plurality of network devices connectable to a network, the network device comprising:
    a peripheral device information collection unit which collects peripheral device information indicating which ones of the network devices are connected to the network while the connection to the network is established;
    a peripheral device information storage unit which stores home network information, which is a chronological list of network devices connected to the network, in accordance with the collected peripheral device information;
    a peripheral device information transmission unit which transmits the home network information stored in the peripheral device information storage unit in compliance with a request from another network device;
    a peripheral device information reception unit which requests the other network device to deliver the home network information stored therein and receives the delivered home network information; and
    a peripheral device information collation unit which collates the home network information received from the other network device through the peripheral device information reception unit with the home network information stored in the peripheral device information storage unit and judges whether the other network device belongs to the same network as the local network device.

4. The network device according to claim 3, wherein, when the rate of agreement of device listings contained in the two pieces of the home network information is not lower than a predetermined value, the peripheral device information collation unit judges that the other network device belongs to the same network as the local network device.

5. The network device according to claim 4, wherein the peripheral device information collation unit calculates the rate of agreement of device listings contained in the two pieces of home network information from the number of device listings that agree with each other consecutively in a chronological direction.

6. A network belonging judgment method for judging whether a first network device and a second network device, which are connectable to a network, belong to the same network, the network belonging judgment method comprising the steps of:
    causing each of the network devices to collect peripheral device information indicating which ones of the network devices are connected to the network while the connection to the network is established;
    causing each of the network devices to store home network information, which is a chronological list of network devices connected to the network, in accordance with the collected peripheral device information;
    causing the first network device to receive the home network information stored in the second network device and collate the received home network information with the home network information stored in the first network device when judging the belonging of the second network device; and judging in accordance with the collation result whether the second network device belongs to the same network as the first network device.

7. The network belonging judgment method according to claim 6, wherein, when the rate of agreement of device listings contained in the two pieces of the home network information is not lower than a predetermined value, it is judged that the second network device belongs to the same network as the first network device.

8. The network belonging judgment method according to claim 7, wherein the rate of agreement of device listings contained in the two pieces of home network information is calculated from the number of device listings that agree with each other consecutively in chronological direction.

9. The network belonging judgment method according to claim 6, wherein, when the first network device is constantly connected to the network and the second network device is connected to the network for a long period of time, it is judged that the second network device belongs to the same network as the first network device even if the second network device is not connected to the network at the time of belonging judgment.

10. The network belonging judgment method according to claim 6, wherein, when the first network device is constantly connected to the network and the second network device is connected to the network for a short period of time, it is judged that the second network device does not belong to the same network as the first network device even if the second network device is connected to the network at the time of belonging judgment.

* * * * *